Sept. 29, 1970  H. SCHMIDT  3,531,159
AUTOMATIC CONTROL SYSTEMS FOR USE IN LONGWALL MINE WORKINGS
Filed Sept. 11, 1968  6 Sheets-Sheet 1
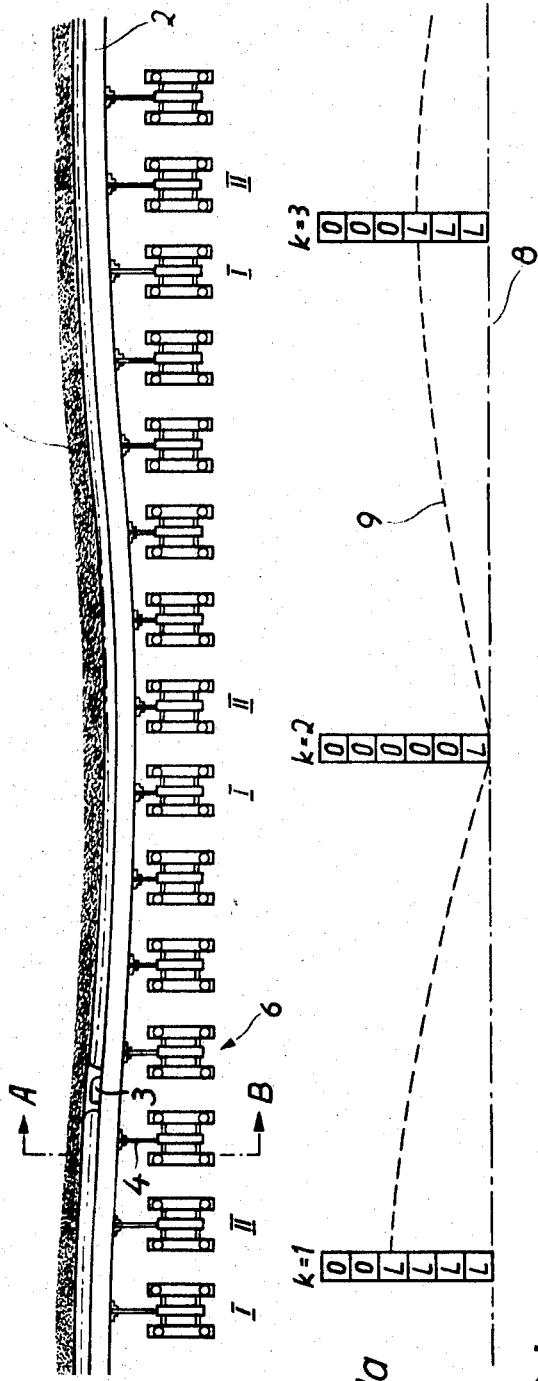
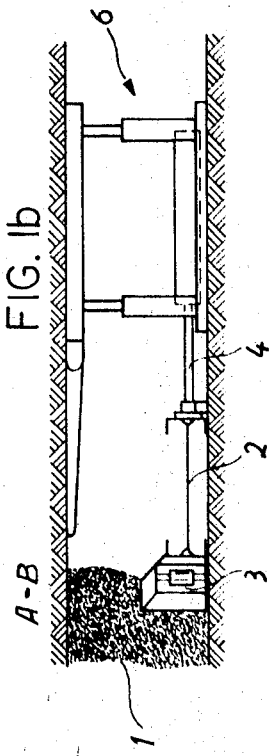
INVENTOR
Helmut Schmidt
attorney

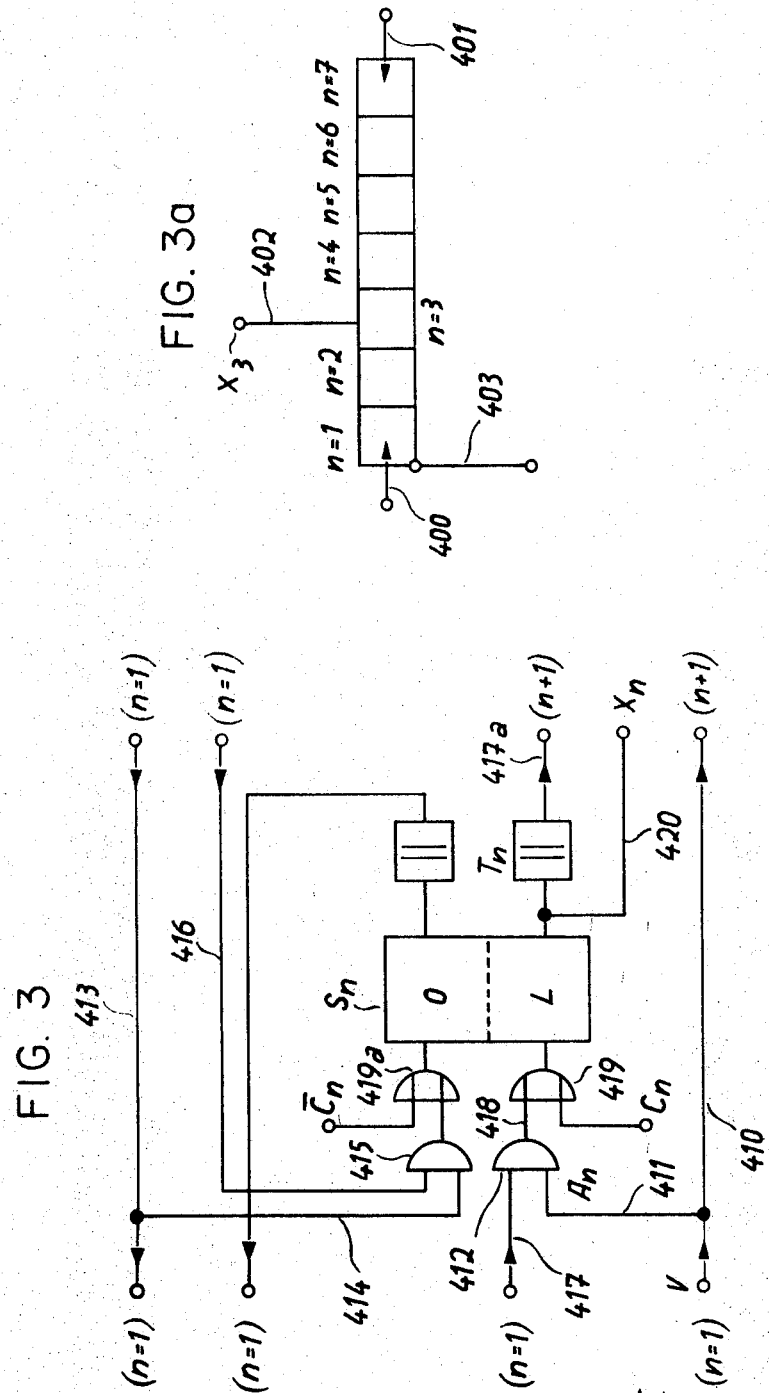

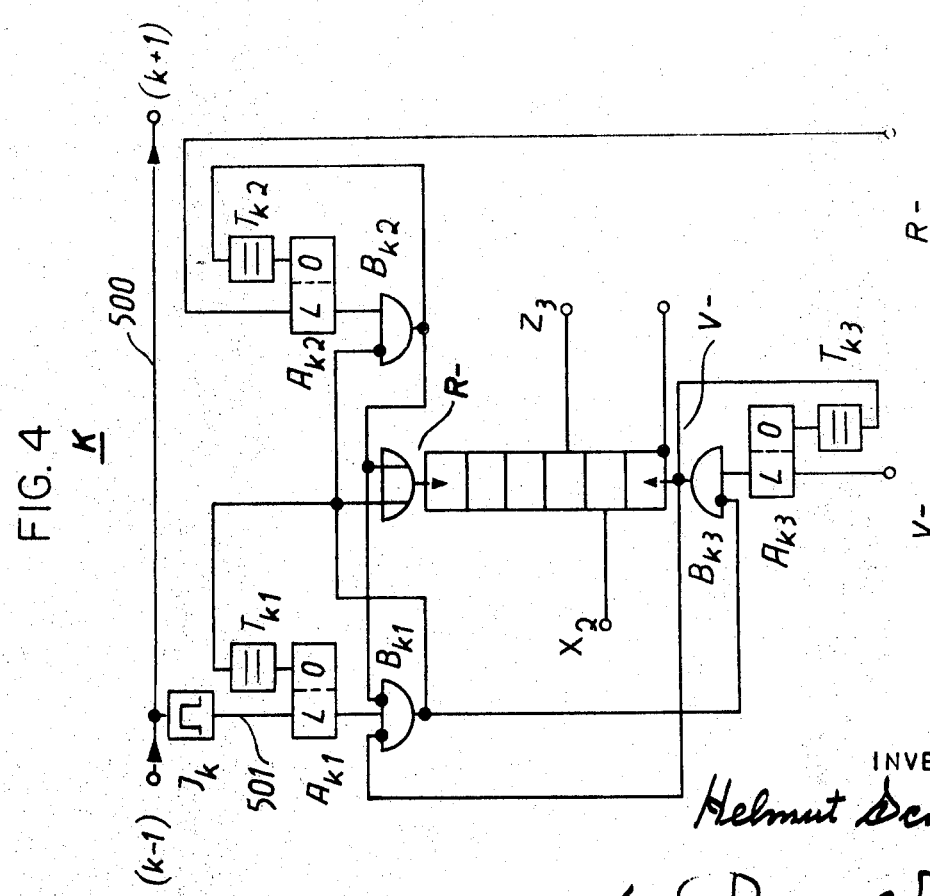

INVENTOR
Helmut Schmidt
by Valentine W. Visser
attorney

United States Patent Office 3,531,159
Patented Sept. 29, 1970

3,531,159
AUTOMATIC CONTROL SYSTEMS FOR USE IN LONGWALL MINE WORKINGS
Helmut Schmidt, Essen-Haarzopf, Germany, assignor to Bergwerksverband GmbH, Essen, Germany, a company of Germany
Filed Sept. 11, 1968, Ser. No. 759,023
Claims priority, application Germany, Dec. 14, 1967, 1,583,073
Int. Cl. E21c 35/14, 35/24
U.S. Cl. 299—1                                      6 Claims

ABSTRACT OF THE DISCLOSURE

The invention relates to an automatic control system which aligns and in given cases turns a longwall mine working, whose desired nominal path is indicated by a straight line or a curve and whose actual path is indicated by positive or negative measurements gauged relative to the desired path, these measurements being produced in the form of digital pulses which are processed by a logic system to form control signals utilised to bring the actual path into correspondence with the desired path by locally differentiated cutting operations on the coal-face being worked.

BACKGROUND OF THE INVENTION

The locally differentiated cutting operations on the coal-face under exploitation may, for example, when an extraction appliance such as a coal-plough is being employed, be effected in a conventional manner by switching off the motion-imparting cylinders or rams at those locations along the longwall where the face is to be left behind; it can also be achieved, however, as is likewise well-known, by arranging that the extraction appliance is steered in a changed direction at the ends of a given stretch of longwall, along which the working is to be enlarged, by means of multiple cutting operations on the coal-face. The control system will then, with this purpose in view, emit locally differentiated control signals in order to switch the motion-imparting cylinders on and off or in order to actuate control means which effect a change in direction.

Automatic control systems of this type do not yet belong to the present state of the art. Up to now, rather, the attempt has been made, by means of local observations, to ascertain an actual path taken by the longwall working that diverges from the desired path, in order to initiate the requisite control signals accordingly, usually by manual means. Such manually operated control systems are out of the question in unmanned longwall workings, i.e. those operated without living human personnel. In all other cases too, they hinder optimal progressive steps in mining because of the complicated way in which the information is passed. Apart from this, it is frequently impossible to ascertain a divergence of the longwall working from the desired path early enough to prevent breakdowns in the operating cycle.

The technical task of creating an arrangement which will automatically assess the path of the longwall working and will adjust or turn this path into the alignment prescribed for it forms the basis of an older proposal which is not yet part of the state of the art and which envisages the employment, as input quantities for the control system, of continuously detected infringements of lower limiting values of the measurements of the actual position gauged relative to the nominal position, whether constant or altering for the turning of the longwall working, the measurements gauged being expressed as the difference between the tracks to be and actually travelled over by the roof support structures.

OBJECT OF THE INVENTION

In contrast with the above, the present invention solves the more specialized task of creating a control system to which the measurements gauged can be directly transmitted as units of information and which, for its part, in the manner of a regulator, matches the actual path of the longwall working at a given instant to the desired path.

BRIEF SUMMARY OF THE INVENTION

The solution of this problem is fundamentally achieved by means of measuring stations which are common to sectors of the longwall working and have measuring devices that resolve the measurement gauged into digital pulses for shifting forward and to the rear, and by means of a logical switching system in which each measuring station has associated with its an integrating unit with storages devices which receives the measurement signals and processes them into a control signal for causing locally differentiated cutting of the coal-face under exploitation, and in which the integrating units are connected "inter se" by a line which interrogates the storage devices and resets them.

FURTHER FEATURES OF THE INVENTION

At each measuring station it is of practical use to employ at least two adjacent measuring devices which can be associated at a given instant with one structure. Each measuring device may consist of a thrust-piston drive unit whose piston, after having at a given instant travelled a certain fractional length, releases a binary rearward (backspacing) or forward pulse. With the assistance of connecting logic elements the signal lines conducting the forward and rearward (backspacing) pulses to the storage devices are switched to the structure, braced at that instant, and to its measuring device. In this manner, errors that might falsify the units of information being transmitted to the automatic control system are eliminated.

The thrust-piston drive units generating this information may be the cylinders, which in several mine roof support systems are located directly on the roof support frames, frameworks or props, in the form of advancing and/or motion-imparting cylinders. Thrust-piston drive units with fractional lengths of their piston stroke identifiable by signals are in themselves already known.

In the event that (in the context of thrust-piston drive units), the matter at issue relates to motion-imparting cylinders, when the structure concerned is unbraced there would be alterations in the position of the longwall conveyor which will, for instance, be serving as an abutment for the action of moving forward. The errors that would arise through this phenomenon during the measurement of the actual path are avoided because the signal lines have at that time been switched over the remaining braced structures.

The above-described control system preferably functions pneumatically, more particularly to obviate the danger of fire and explosion, but for other reasons too. In practice, then, the control system will be so formed that the integrating unit associated with each measuring station will possess a two-way shift register which contains the storage devices receiving the measurement signals and in which every forward pulse renders signal-carrying, a further storage device, in order by this means to shift the signal forward in the register, and every rearward pulse shifts the signal in the register back by one storage device, while in the two-way shift register a storage device which marks the desired value, a storage device following the one just mentioned in the forward direction and emitting the control signal, and an interrogation storage device along with the device-interrogating line connected to it are selected, the control system also being formed that a signal is present on the storage device interrogating line immediately when all the interrogation storage devices are rendered signal-carrying and the signal on the resetting line releases a resetting signal which leads to a resetting pulse at the registers.

The signal in the shift register can only be displaced by pulses. Pneumatic pulses, however, in contrast to electric pulses, cannot be transmitted over the distances that may in practice be desired. Therefore, in the case of pneumatic embodiments of the invention, a pulse is constituted from a signal which can be produced at a distance. This is preferably effected in such a manner that the storage device interrogating line and the resetting line are connected with each other in front of the first and behind the last integrating unit, and that on one of the connections the resetting signal erases the interrogation signal in order to erase the resetting signal at the other connection, the erasure of the resetting signal thereupon generating a fresh interrogation signal.

Because of the comparatively lengthy travelling time of pneumatic signals, the possibility cannot be excluded that several pulses may appear simultaneously at the inputs of the storage devices. A further embodiment of the logical control system according to the invention renders it possible to keep the pulses separate. To this end, storage devices are provided for all the pulses, the devices being interposed before the register inputs and being cut off in relation to each other so that simultaneously arriving pulses are transferred to the register in succession.

In the control system according to the invention, signal-carrying storage devices of like or differing priorities in the registers preferably release the control signals appropriate at a given time for the differential cutting of the coal-face. A further embodiment is characterized by further signal inputs to the shift register for the displacement of the signals as desired. The possibility then exists of selecting at will the storage devices which release the control signal. By this means the desired path of the longwall working can be altered; the longwall working can, for example, be turned.

DRAWING TITLES

Some embodiments of the invention will be explained in greater detail and by way of example hereinafter, with reference to the accompanying drawings, in which:

FIG. 1 shows in diagrammatic form a sector from a longwall working with the automatic control system according to the invention;

FIG. 1a is a section perpendicular to the stratification;
FIG. 1b is a section along the line A–B of FIG. 1;

FIG. 3 shows a storage device with its logical switching circuitry;

FIG. 3a shows a diagram of the shift registers;

FIG. 4 shows a logic circuit of an integrating unit which contains a shift register;

FIG. 4a shows three shift registers in which the longwall working is aligned along a straight line;

FIG. 4b shows also three shift registers in which the longwall working has advanced;

DESCRIPTION OF EMBODIMENTS

Figure 2:
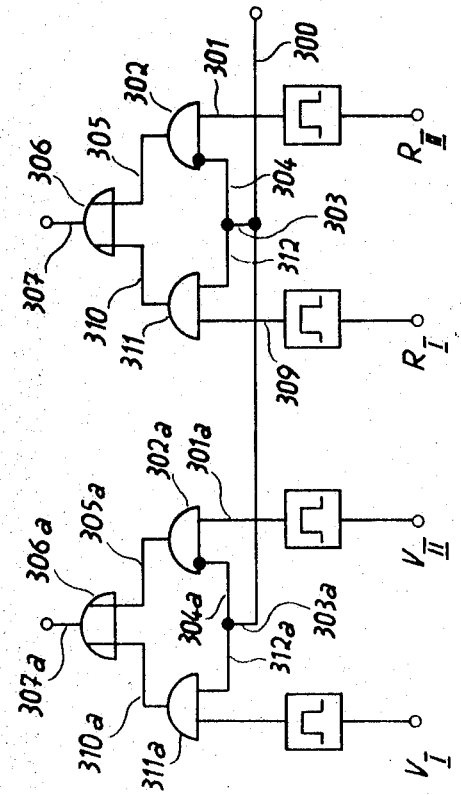
FIG. 2 shows the logic circuit at the measuring stations.

Lengthwise along a coal-seam 1 there is laid a conventional extracting and conveyor appliance which, in the embodiment illustrated, consists of a scraper conveyor 2 with double chains, at the coal-face end of which a coal-plough 3 is carried. On the stowing side the conveyor carries connections for the piston-rods 4 of the motion-imparting and advancing cylinders which are attached to the roof support props 6. The type of mine roof support is optional. For the automatic control system explained hereinafter, however, it is a prerequisite that adjacent props 6 should not advance simultaneously but in succession.

In the embodiment shown in FIG. 1, measuring stations are arranged at intervals, those stations consisting of measuring devices arranged in each instance on structures denoted by I and II. Between these measuring structures there are located normal structures at which no measurements are effected and at which the path of the longwall working is interpolated. The desired path corresponds to a straight line 8, but it could also follow a curve. The actual path of the longwall working is determined by measurements taken by the measuring stations and the interpolation of which results in the broken line 9 in FIG. 1a.

As emerges from the illustration according to FIG. 1a, the part of the longwall located between the measuring station $k=1$ and the measuring station $k=3$ has been left behind. In order to bring the curves 9 into correspondence with the line 8, the possibility exists of allowing the plough 3 to proceed backwards and forwards several times between the measuring stations $k=1$ and $k=3$, until at measurement station $k=2$ the longwall working has been adequately enlarged.

The possibility also exists of switching off the motion-imparting cylinders to the left of the measuring station $k=1$ and to the right of the measuring station $k=3$, as a result of which the plough 3 will lose its contact with the main coal-face and will work exclusively against the area of the longwall between the measuring stations $k=1$ and $k=3$.

In both cases the automatic control system described hereinafter will supply the requisite control signals. For the rest, in the description the last-mentioned possibility will form the starting point, that is to say, the control signals will serve to switch the motion-imparting cylinders on and off.

The motion-imparting cylinders, constituted by hydraulic thrust-piston drive units in the structures I and II of each measuring station, are constantly subject to pressure in the case of braced structures. Consequently the extended length of the piston-rod at a given instant yields the measurement gauged from inside the actual path 9 in relation to the desired path 8. The extended length of the piston-rod of thrust-piston drive unit at a given instant is resolved into fractional lengths with which digital pulses are associated. Digital forward and rearward pulses are distinguished. When, for instance, the plough 3 presses the conveyor 2 back, the result is a corresponding number of rearward pulses, but when the piston presses the conveyor forward, then forward pulses are produced.

In the circuit diagrams of FIGS. 2 to 5 which reproduce the logic circuits that select and process these pulses, the customary symbols for the storage devices and connecting elements have been employed. In this instance, the control system has been arranged as a pneumatic control system, and it functions with appropriate elements.

Control is carried out by means of binary signals, i.e. affirmative and negative indications denoted by L and O respectively. If an O signal is to be produced from an L signal, then the matter being dealt with is a negation which is reproduced by a point at the function concerned. If the negating point is located on the output side, the result of the logical sequence of switching is to negate, but if it is located on an input line, then the signal concerned has first to be negated and then to be logically combined with the other input signals.

(1) Acquisition and transmission of the measurement gauged from inside (FIG. 2)

In the example of an embodiment shown here, one proceeds from the assumption that as a general rule the structure I takes over the measuring procedure by means of its motion-imparting cylinder, which represents a thrust-piston drive unit, i.e. it only fails to measure when it has been relieved of weight in order to make an advance. In that event, the motion-imparting cylinder of the structure II will take over the measuring procedure.

Figure 2A:
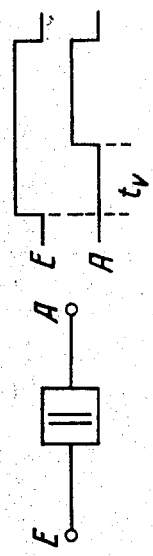
FIG. 2a is a diagram showing a time-delay element.

If the piston of the motion-imparting cylinder performing the measurement has travelled a fractional length along its full extension stroke, then a measuring element, for example a perforated disc turned with the aid of the piston-rod, releases a jet of air. Therefore, in the case of an unfavourable position of the piston-rod, instead of a pulse a prolonged signal can be emitted. In order to prevent this, all forward and rearward pulses proceeding from the thrust-piston drive unit concerned are converted into pulses of equal length made as brief as practicable. According to the embodiment this is effected by recourse to a time-delay element which is shown in FIG. 2a. From the switching process indicated, it is clear that an input signal E is delayed, by a time-delay function $t_v$, at the output A. The logic circuit of this time-delay element is reproduced in FIG. 2c.

Figure 2B:
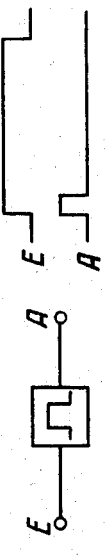
FIG. 2b shows a diagram of the symbol and the switching process of the pulse former.
Figure 2C:
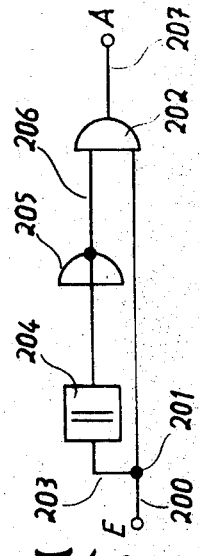
FIG. 2c shows a diagram of the logic circuit of the time-delay element.

The signal arriving along the line 200 at E proceeds via the bifurcation 201 to the time-delay element 204 and to the AND element 202. A signal immediately appears at the output A, since because of the delay in switching on through 204 no signal is present at first at the input of the negating element 205 and accordingly the output 206 carries the signal. If, however, the time-delay function 204 has put the connection through, the signal at 206 and accordingly also the output signal at A will be erased again, so that from a prolonged signal a pulse will have been produced. A fresh pulse can only be produced after switching off and again switching on the signal at E. In FIG. 2b, to the left of centre, the symbol and the switching process of the pulse former is indicated.

The thrust-piston drive units of structures I and II respectively supply forward and rearward (backspacing) pulses. The symbol and switching process of the pulse formers are reproduced on the left in FIG. 2.

As long as the measuring structure II is braced, its thrust-piston drive unit supplies a signal to the line 300. A rearward pulse $R_{II}$ from the thrust-piston drive unit appertaining to the measuring structure II arrives by way of line 301 at the non-negated input of an AND element 302. Since by way of the branch line 303 the line 304 is also carrying a prolonged signal and thus the negated input of the AND element 302 is carrying no signal, no signal appears at 305 at the output of the AND element 302. Consequently, at the OR element 306 with output 307, no signal is produced at first.

If however, a rearward pulse $R_I$ appears on the line 309 from the measuring structure effecting the measurement, then a signal is produced on the output 310 of an AND element 311 because the signal present at 300 arrives in the second, non-negated input 312 and the AND element 311. Then an output signal will be produced at the OR element 306 along the line 307.

As soon as the signal collapses on the line 300, a signal is produced at 307 if a pulse appears at 301, which can only come from measuring structure II.

The circuitry described for the rearward pulses $R_I$ and $R_{II}$ is identical with that for the forward pulses $V_I$ and $V_{II}$. Thus, the logic circuit for the forward pulses is provided with the same reference numerals as is the circuit for the rearward pulses, the suffix $a$ being added.

In contrast with the embodiment shown in FIG. 2 and described above in detail, the possibility also exists of employing the measuring structures I and II alternatively and on an equal footing for taking the measurement gauged from the inside. A further possibility is that of carrying out a simultaneous evaluation of the pulses coming in from the hydraulic thrust-piston drive units of the two structures I and II.

In the case of the embodiment shown it emerges, however, that the switching over from measuring structure I to measuring structure II and vice versa is dependent upon whether the hydraulic thrust-piston drive unit is fastened on the roof support frame or is mounted in another manner, to be then brought up from the rear from time to time.

Only the following condition must be fulfilled, that of the two adjacent thrust-piston drive units appertaining to structures I and II only one thrust-piston drive unit at a time should be relieved and drawn forward.

(2) Processing of information in two-way shift registers (FIGS. 3 and 4)

The binary forward and rearward pulses coming from the thrust-piston drive units appertaining to measuring structures I and II are, according to the details given above, pulses of predetermined and comparatively brief duration. They constitute the information inputs of a logic circuit which must be explained hereinafter.

One of the main elements of the control system is a two-way shift register. Each measuring station, i.e. two adjacent measuring structures I and II, has, according to FIG. 1, a shift register associated with it, that is, shift registers $k=1$, $k=2$, $k=3$ ... $k=n$ are present in the circuit. A diagrammatic presentation of the shift registers is reproduced in FIG. 3a.

The shift register consists of $N=7$ storage devices in the embodiment shown. At 400 the shift register has an input for the forward pulses, and at 401 an input for the rearward pulses from the measuring station. The shift register at storage device $n=3$ has a signal outlet 402 which, in the embodiment shown, serves to switch off the motion-imparting cylinders in the normal plane associated with the measuring station. Apart from this, the shift register has a further signal input 403 for pulses to its forward-motion adjustment mechanism.

According to FIG. 3, the forward pulses are simultaneously fed to all the storage devices in the shift register by way of a line 410. A forward pulse along line 410 therefore arrives by way of line 411 at the AND element 412. The rearward pulses of the measuring devices appear in respect of all the storage devices of a shift register simultaneously along the line 413 and so arrive by way of line 414 at the input to an AND element 415.

A forward pulse arrives at a storage device only when the forward pulse is present on line 410 and when, apart from that, there is a signal present from the preceding storage device $(n-1)$ at 417. There then appears on line 418, and thus at the OR element 419, a pulse which is accepted by the storage device $S_n$. The storage device can be interrogated at 420, $X_n$.

The onward transmission of the YES pulse occurs by way of a time-delay element $T_n$ along line 417a to the storage device $(n+1)$. The onward transmission of the signal for storing is therefore delayed until the existing forward pulse has faded.

It will be understood without further explanation that analogous circuitry will result in the same effects in respect of the rearward pulses.

Apart from this, the OR element 419 and 419a possess inputs $C_n$ and $\overline{O}_n$. It is by way of these inputs that the storage device can be set forward and back at will, with the measuring devices being circumvented.

In the embodiment according to FIG. 3a, a signal will appear along the line 402 if at least the storage devices $n=1$, $n=2$, $n=3$ are occupied by a signal. No signal will appear along the line 402 when the storage device $n=3$ contains no signal.

The entire circuit appertaining to a measuring station is reproduced in FIG. 4.

A longwall signal line 500 connects all the two-way shift registers $k=1$, $k=2$ . . . $k=n$. If a signal appears along the line 500, the signal will arrive at a pulse former $I_k$, which causes a pulse to appear along the line 501. This pulse reaches a storage device $A_{k1}$.

Storage devices $A_{k2}$ and $A_{k3}$ are provided for the forward and rearward pulses from the measuring station as they come in. If the storage device $A_{k1}$ has accepted a signal and transmitted it onwards via the AND element $B_{k1}$, then the outputs of the storage devices $A_{k2}$ and $A_{k3}$ become cut off by way of the AND elements $B_{k2}$ and $B_{k3}$, with the consequence that pulses which arrive simultaneously are processed in succession. The output signal appearing at $B_{k1}$ proceeds by way of an OR element into the R input of the shift register and sets the register back by one unit. At the same time, the signal is fed back via the time-delay element $T_{k1}$ to the erasure input of $A_{k1}$ and erases $A_{k1}$ after a period determined by $T_{k1}$, so that only such pulses as may be stored in $A_{k2}$ or $A_{k3}$ can be processed. In a similar manner the storage devices $A_{k2}$ and $A_{k3}$ cut off the storage device $A_{k1}$. A cut-off arrangement between $A_{k2}$ and $A_{k3}$ is not required, since forward and rearward pulses cannot arrive simultaneously.

By way of example, in FIGS. 4a and 4b there are shown three shift registers, the signal conditions of which are now considered. In the case shown on FIG. 4b, the longwall working is aligned along a straight line, since all the $S_1$ storage devices are carrying a signal, while none of the $S_2$ storage devices are occupied by a signal. In the case shown in FIG. 4b, the longwall working has advanced rapidly at the stations $k=1$ and $k=3$, a matter which can be ascertained by interrogation of the $S_2$ storage devices. If a storage device $S_2$ carries a signal, then the relevant motion-imparting cylinder must be switched off, but if the device carries no signal, the cylinder must be re-activated.

A suitable switching system involving pulse-counting may naturally be employed in place of the shift register.

Figure 5A:
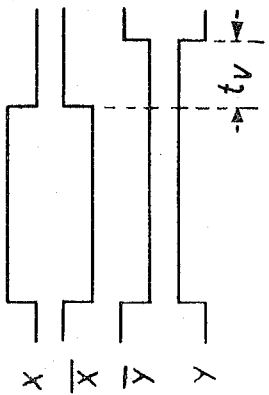
FIGS. 5 and 5a show the logical switching circuitry of several shift registers, and FIGS. 6 and 6a consist of diagrammatic reproductions of various arrangements of the shift registers.
Figure 5:
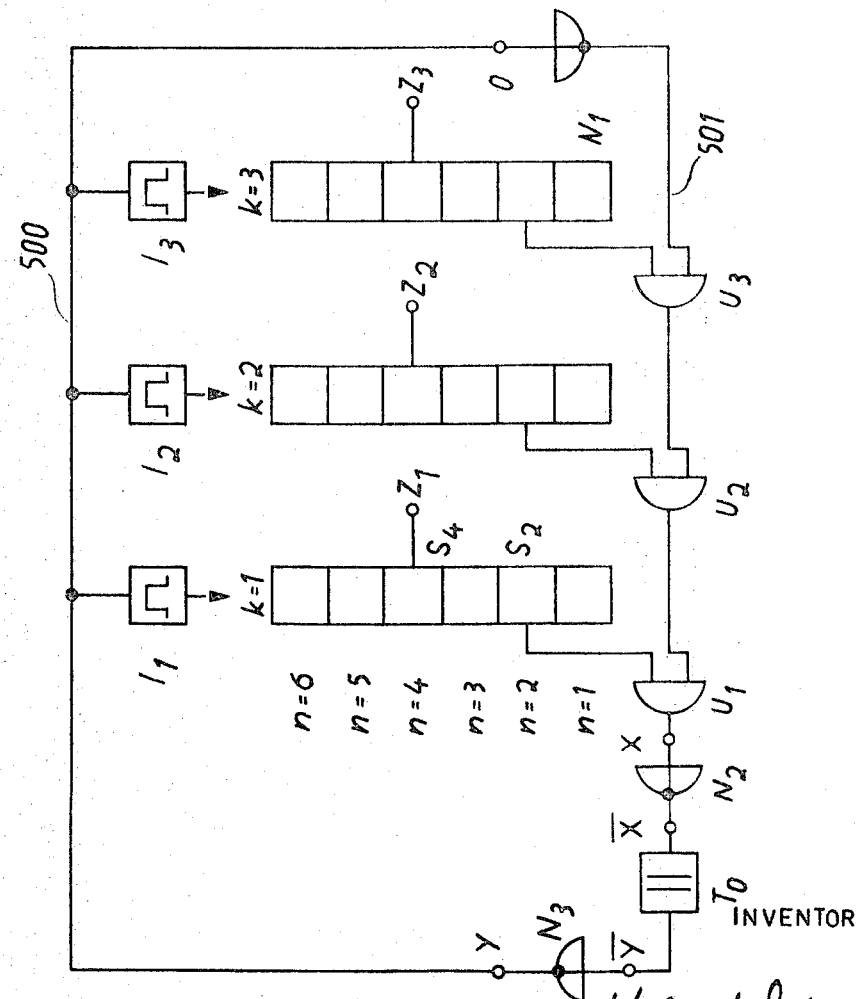

(3) Interrogation and resetting of the shift registers (FIG. 5)

In FIG. 5, which shows only those parts necessary to make matters properly understandable, the shift registers are designated $k=1$, $k=2$ and $k=3$, an interrogating line is designated 501, the longwall signal line is designated 500 and the pulse former inputs to the individual measuring stations are designated I, $I_2$ and $I_3$.

To begin with, the longwall working is aligned along its desired line 9. All the storage devices $S_1$ are carrying a signal, whereas the succeeding storage devices are not displaying a signal. At the location X along the interrogating line appertaining to the working, a signal can appear only when all the storage devices $S_2$ have made a through-connection, i.e. when the longwall working at every location has made an advance of one digital unit. With the signal pattern indicated at X, the locations $\overline{X}$, $\overline{Y}$, Y have the pattern indicated on FIG. 5a. The result of this is as follows:

If an interrogation signal has arrived at X, then a signal is also produced at Y, this latter signal proceeding via the longwall signal line 500 and setting the shift registers back in succession. The first shift register is set back immediately. Then the signal at X can be cut off by the closing of the AND element $U_1$. The elements $N_2$, $T_0$ and $N_3$ bring about a delay in the switching-off process, however, in order to maintain the signal on the longwall signal line 500 until it has passed the last measuring station and set all the shift registers back. If the resetting signal has travelled along the longwall signal line as far as point 0, then the AND element $U_2$ will be switched off by way of the negating element $N_1$ sufficiently long for the resetting signal at 0 to have disappeared; $U_3$ can now open again, and a fresh interrogation cycle can commence. According to FIG. 4a, motion-imparting cylinders are switched off when the pertinent storage devices $S_4$, and consequently the outputs $Z_k$, are carrying a signal.

From FIG. 3 it can be seen that the signal level in the shift registers affords a measure of the distance of the shielded conveyor from the reference line applying to the longwall working. Alignment along a straight line is effected thus, that at a given instant the same storage devices on the shift register, for instance all the $S_2$ storage devices, are interrogated. By an alteration in the interrogation line, it is also possible to effect an alignment along a non-linear reference line, for instanec along a convex or concave path for the longwall working.

Figure 6:
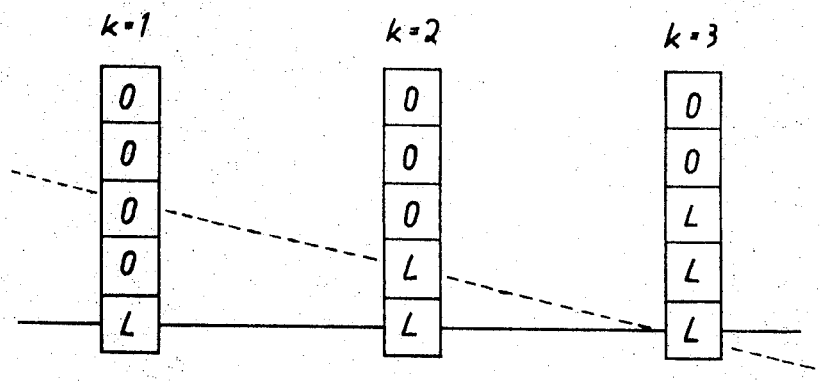
Figure 6A:
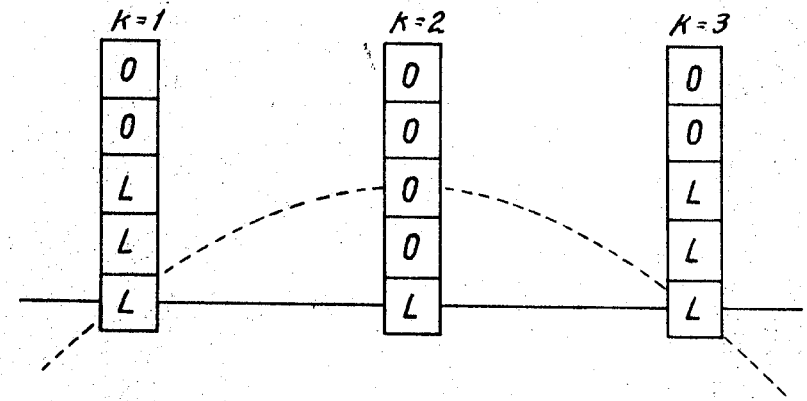

The desired path can likewise be altered by an alteration in the arrangement of the registers. Thus, alteration of the desired line can be effected by moving the shift registers forward. Two examples of this are shown in FIG. 6. On the left in FIG. 6, the indicated setting has the effect that the motion-imparting cylinders for $k=2$ and $k=3$ remain switched off until the reduction of the shift registers has been performed. By then, however, the longwall working at the station $k=1$ has been advanced by two units and at the station $k=2$ by one unit, i.e. the path along the working shown in a chain-dotted line has been adjusted for. In FIG. 6a, a convex path along the working will be obtained by the adjustment indicated.

An alteration in the path of the longwall working is therefore effected thus, that at those stations at which the working is to be left behind, a corresponding number of forward pulses are fed into the relevant shift registers. The feed-in of these pulses can be effected either manually at the individual measuring stations or via supplementary signal lines from a central control point of the longwall working.

I claim:
1. In a longwall mine working wherein the working face is cut by cutting machinery, an automatic control system for aligning the actual path of the working with a desired path, comprising a plurality of gauging devices at spaced stations along the face indicating by means of positive and negative measuring signals those positions along the working that are in advance of and behind the said desired path, said measuring signals being produced in the form of digital pulses;

a logic system which for each gauging position includes an integrator connected to a storage device, which logic system processes the digital pulses to produce control pulses, said logic system also including lines interconnecting the integrators and associated storage devices;

means for interrogating the storage devices through one said line to release the control pulses selectively and for resetting the storage devices through another said line;

and means for feeding the selectively released control pulses to the cutting machinery to effect locally differentiated cutting at the working face.

2. An automatic control system according to claim 1, including two gauging devices at each gauging station, each being associated with one of two adjacent pit prop support units, each said gauging device comprising a cylinder and piston device, whose piston stroke is divided into fractional lengths, and means whereby digital pulses are produced in dependence on the number of fractional lengths covered by the piston travel, whilst the two gauging devices at each gauging position are selectively connected to the logic system to feed said pulses on a binary system into the associated integrator, the logic system including switching means for disconnecting a gauging device from its associated integrator when the pit prop support unit associated with said gauging device is unbraced.

3. An automatic control system according to claim 1, wherein each gauging station includes a two-way shift register which contains the storage devices receiving the digital pulses and in which every forward pulse renders signal-carrying a further storage device, and by this means shifts the signal in the register back by one storage device, while in the two-way shift register a storage device which marks the desired value, a storage device following the one just mentioned in the forward direction and emitting the control signal and an interrogation storage device along with the device-interrogating line connected to it are selected, and a signal is produced on the storage device interrogating line immediately all the interrogation storage devices are signal-carrying and the signal on the resetting line belonging to the longwall working releases a resetting signal which releases a resetting pulse at the registers.

4. An automatic control system according to claim 1, wherein, in front of the first and behind the last integrating unit, the storage device interrogating line and the resetting line are connected with each other and in that on one of the connections the resetting signal erases the interrogation signal in order to erase the resetting signal at the other connection, the erasure of the resetting signal thereupon generating a fresh interrogation signal.

5. An automatic control system according to claim 1, including, for the resetting pulses on the resetting line and the digital pulses from the gauging devices, storage devices interposed in front of the inputs to the registers and which are cut off in relation to each other so as to transfer in succession the pulses which arrive simultaneously.

6. An automatic control system according to claim 1, including means for feeding additional signals to the shift registers for displacement at will of the signals carried therein.

References Cited
UNITED STATES PATENTS 3,362,750    1/1968    Carnegie             299—1
3,392,531    7/1968    Ratz                61—45.2

ERNEST R. PURSER, Primary Examiner

U.S. Cl. X.R.
61—45